(12) United States Patent
LaCost et al.

(10) Patent No.: US 6,453,317 B1
(45) Date of Patent: Sep. 17, 2002

(54) CUSTOMER INFORMATION STORAGE AND DELIVERY SYSTEM

(75) Inventors: Sherman LaCost, Durham, NC (US); Kenneth Presser, Morrisville, NC (US); Charles Edward Jones, Jr., Cary, NC (US)

(73) Assignee: WorldCom, Inc., Clinton, MS (US)

( * ) Notice: Subject to any disclaimer, the term of this patent is extended or adjusted under 35 U.S.C. 154(b) by 0 days.

(21) Appl. No.: 09/163,228

(22) Filed: Sep. 29, 1998

(51) Int. Cl.[7] .............................. G06F 17/30; G06F 7/00
(52) U.S. Cl. .............................. 707/10; 707/9; 709/217
(58) Field of Search .............................. 379/220; 707/10, 707/9; 705/9, 54; 709/217

(56) References Cited

U.S. PATENT DOCUMENTS

| | | | | |
|---|---|---|---|---|
| 5,742,905 A | * | 4/1998 | Pepe et al. .................. | 455/461 |
| 5,748,718 A | * | 5/1998 | Manicone .................... | 379/131 |
| 5,930,764 A | * | 7/1999 | Melchione et al. .......... | 705/10 |
| 5,950,173 A | * | 9/1999 | Perkowski ................... | 705/26 |
| 5,982,891 A | * | 11/1999 | Ginter et al. ................ | 705/54 |
| 6,018,619 A | * | 1/2000 | Allard et al. ............... | 709/224 |
| 6,032,184 A | * | 2/2000 | Cogger et al. .............. | 709/223 |
| 6,061,692 A | * | 5/2000 | Thomas et al. ............. | 707/200 |
| 6,064,973 A | * | 5/2000 | Smith et al. ................... | 705/7 |
| 6,085,242 A | * | 7/2000 | Chandra ...................... | 709/223 |
| 6,092,112 A | * | 7/2000 | Fukushige ................... | 709/229 |

OTHER PUBLICATIONS

SunSoft, "NFS Administration Guide, Solaris Version 2.4", Sun Microsystems, Inc., 1994. pp. 31–37, 78–81.*

* cited by examiner

*Primary Examiner*—Jean R. Homere
*Assistant Examiner*—Luke S Wassum

(57) ABSTRACT

A system and corresponding method for storing and delivering customer information. The system and method include and involve a data storage system for storing customer information including contact information, network addressing information, and engineering and customer service information related to at least one network service customer to whom network services are provided by a network service provider. The system and method also include and involve a network access system that is coupled to the data storage system via at least one data communications link and which is configured to provide access to at least one user to permit such user(s) to retrieve the customer information from the data storage system.

21 Claims, 2 Drawing Sheets

CUSTOMER INFORMATION STORAGE AND DELIVERY SYSTEM

BACKGROUND OF THE INVENTION

1. Field of the Invention

The present invention relates to systems and processes that are deployed to store and deliver customer and project information to relatively large user populations. More particularly, the present invention relates to database management systems which are used to store and deliver customer and project related information to users of the same via network connections.

2. Description of the Related Art

In large organizations such as those that are service oriented, the storage and retrieval of information related to ongoing projects and customers often present significant problems for system managers, customers, and service support staff. In particular, service based organizations such as telephony and communications organizations have no effective way to store and disseminate information that may be used by engineering staff, support personnel, and, most importantly, customers to obtain needed information about ongoing projects, status data, performance metrics, etc. For example, when service problems occur (e.g., network outages), it is not uncommon for customers to scurry to obtain current and valid contact numbers and addresses of key personnel who can correct or otherwise handle and address such problems. As a result, frustrations on the part of customers can run high, services often are interrupted, and problems are not effectively and efficiently addressed and resolved.

To address the problems associated with storing and delivering current information such as customer related information (e.g., support staff contact numbers and electronic mail addresses, etc.), many solutions have been proposed. For example, many organizations have implemented what have been referred to as "intranets" to allow organizational personnel to access central data repositories to retrieve contact information and the like. Unfortunately, such intranets often only allow small groups of select users (e.g., internal personnel) to access such information. Historically, intranets have not been deployed to allow larger user populations such as those including internal support and engineering personnel and external personnel such as customers to access central repositories of project and customer information.

To address the limitations of conventional intranets, "extranets" have been proposed to address the constant need to provide access to project and/or customer information. Such systems allow larger user populations to access databases of relevant information. Unfortunately, however, extranet systems have not been deployed in any common, uniform, or convenient way to facilitate easy and efficient use by larger user populations. In particular, each customer or project often calls for a separate and distinct network system, thus requiring an extranet to be established on al la carte, custom basis. Accordingly, the instantiation of a special extranet system to support each particular customer can become a project that may be more resource intensive to establish and operate than the underlying services to which it is to relate.

Moreover, in prior networked information delivery systems such as those embodying extranets and, in particular, in those utilized in organizations that provide telecommunications services, network management centers compiled trouble and customer support ticket data which was sent to various account teams. Upon receipt of such ticket data, the account teams would produce various reports for perusal by internal staff and customers. Accordingly, the information gathered via ticket responses, etc. was prepared internally and then delivered to customers for their processing. In prior systems, there was no way for customers, for example, to access an information repository managed by a service organization and retrieve live, up-to-date reports and analyses of system and network performance, statistics, contact information, process instructions, etc.

Accordingly, there exists no truly effective solution to the ever-present problem of providing project and customer information to diverse user populations. And, as organizations take on more customers and/or offer more services (e.g., telecommunications services, etc.), they are faced with allocating resources merely to control and service the demands for information that ought to be readily and immediately available. Because there are no shared repositories of information between user groups within a particular organization, that information must be disseminated and, often, replicated within a corresponding system. Such redundancy is often the cause of many inconsistencies among stored information.

Thus, there exists a need to provide a system and corresponding process for storing and providing customer and project related information to diverse user populations. To be viable such a system must be able to store customer and projected related information in a central repository that is accessible from inside and outside of an organization. Such a system must store and deliver information related to customers and projects including, but not limited to, personnel contact information, engineering information project status information, project planning procedures, etc. which is retrievable using conventional network data and content retrieval tools such as web browsers, etc.

SUMMARY OF THE INVENTION

The present invention solves the problems mentioned above by providing a centralized data store containing information related to customers and projects that is easily accessible by diverse user populations including internal organizational personnel and external personnel such as customers. As such, the present invention provides many benefits associated with data storage and distribution not heretofore realized by prior database management systems and facilities. For example, during times of network or service related problems (e.g., service failures, outages, etc.), customers can now easily access a centralized data store to retrieve engineering and contact personnel information, learn about corrective procedures and processes, and, possibly, page and otherwise automatically initiate contact to personnel that are equipped and trained to respond to a particular service customer's needs. Additionally, because the present invention utilizes standard tools and facilities (e.g., web servers coupled to web browsers, etc.) to distribute information and customer content (e.g., project related information such as statistics, etc.), users are able to access such information without having to know or understand special system protocols, etc.

The present invention solves the aforementioned problems to deliver the benefits mentioned above by providing a system and corresponding method for storing and delivering customer information. The system and method include and involve a data storage system for storing customer information including contact information, network addressing information, engineering, and customer service information related to at least one network service customer to whom network services are provided by a network service provider. The system and method also include and involve a network access system that is coupled to the data storage system via at least one data communications link and which is configured to provide access to at least one user to permit such user(s) to retrieve the customer information from the data storage system.

According to another aspect of the present invention, provided is a method of using a data communications network that includes the steps of accessing a data communications network via a network connection, receiving a login authorization prompt to be validated within the data communications network, entering a login sequence via the network connection to be validated by a validation system within the data communications network, accessing a document delivery system within the data communications network after being validated by the validation system, and receiving customer information from the document delivery system based on the login sequence. The customer information includes contact information, network addressing information, engineering and customer service information related to at least one network service customer to whom network services are provided by a network service provider.

BRIEF DESCRIPTION OF THE DRAWINGS

The present invention is discussed in detail below with regard to the drawing figures attached hereto, of which.

DETAILED DESCRIPTION OF THE PREFERRED EMBODIMENTS

Figure 1:
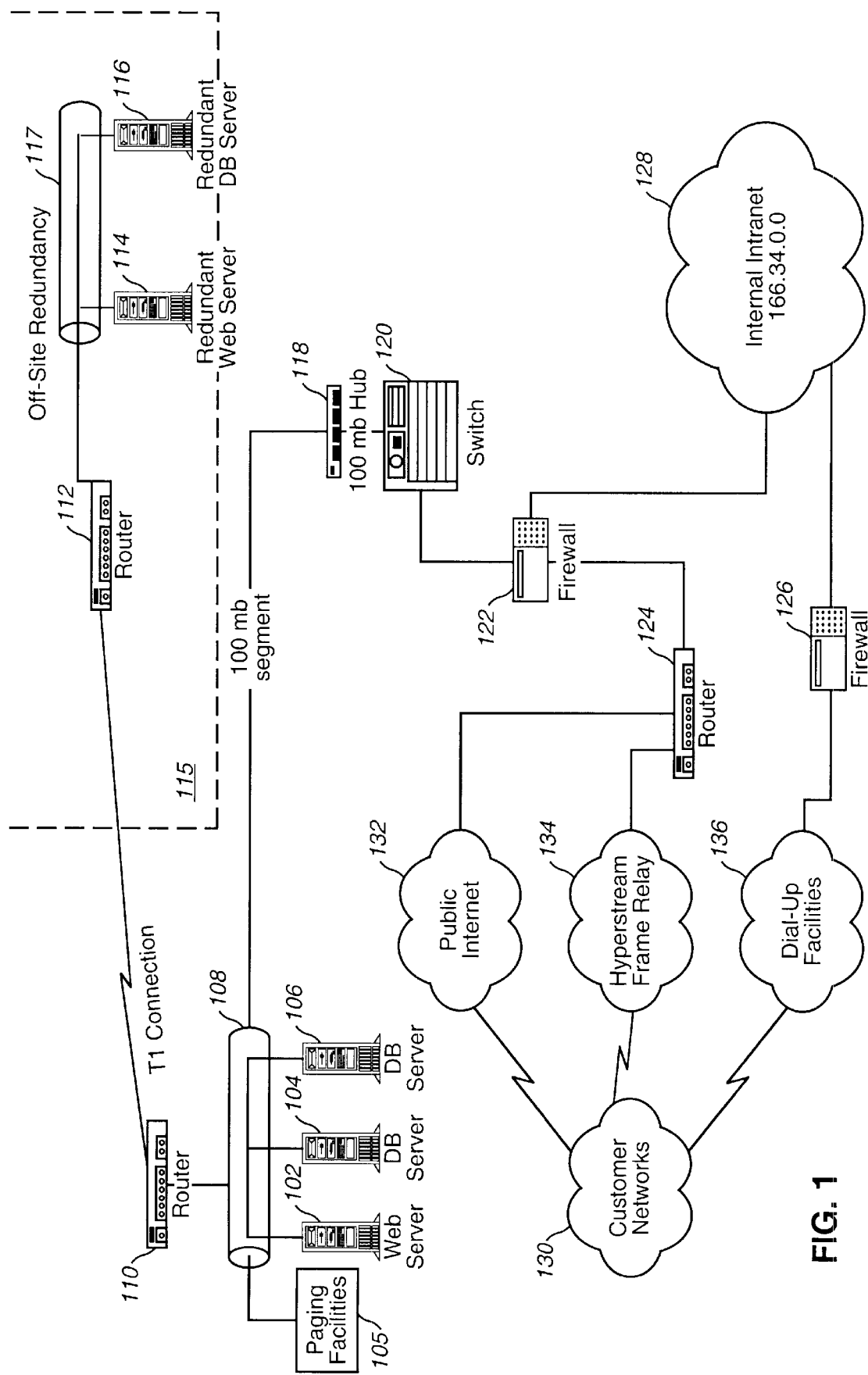
FIG. 1 is a diagram of a system in which customer and project related information is centrally stored within a common data repository and delivered via network connections.

The present invention is now discussed in detail with regard to the drawing figures that were briefly described above. Unless otherwise indicated, like parts and processes are referred to with like reference numerals.

Referring now to FIG. 1, depicted therein is a diagram of a system in which customer and project related information is centrally stored within a common data repository and delivered, possibly to customers, via network connections. More particularly, FIG. 1 illustrates a system in which shared databases containing customer related information may be stored within server system and delivered to users such as customers via a variety of network connections. Such shared databases may include fields and tables needed to track network information for customers and/or projects. Such tables will include data such as IP addresses, protocols, phone numbers for contacts, personnel, passwords, and other contact information. Such data will be useful to customers, engineering staff, support personnel, account teams, etc. Additionally, databases stored in shared fashion in accordance with the present invention may include procedures and process instructions that further include escalation lists for problem handling, new site verification instructions, ticket opening and closing details, etc.

Accordingly, exemplary system 100 provides such data services and includes a web server 102 (e.g., one that operates in accordance with the Netscape Enterprise Server, WINDOWS Internet Information Server packages, etc.), database servers 104 and 106 (e.g., server systems that operate in accordance with the WINDOWS SQL Database server software package which is manufactured and marketed by MICROSOFT CORPORATION). A network backbone 108 (having an IP address 205.223.?.?—an IP address accessible via a TCP/IP based network), a router 110 coupled to a redundancy platform 115 that includes a router 112, a network backbone 117, a redundant web server 114, and a redundant database server 116.

Coupled to web server 102 are paging facilities 105 which are configured to automatically initiate pager notification calls in response to requests for the same from users who access web pages that facilitate immediate contact. Such paging facilities will be readily understood by those skilled in the art to allow numeric and text paging such as that used to send personnel text messages such as "CUSTOMER XXX NEEDS NETWORK TRAFFIC SUPPORT RELATIVE TO A DOWNED NETWORK SERVER."

Also coupled to network backbone 108 via an exemplary network traffic interconnect is a hub and switch system comprising components 118 and 120. Connected thereto is a firewall system 122, a router system 124, a firewall system 126 and an organizational internal Intranet system 128. Organizational Intranet 128 may be configured to operate according to a protocol such as TCP/IP and may be addressable via an IP address such as 166.34.0.0 (a private IP address not necessarily registered with an IP address registration authority).

Coupled to the structures mentioned above, are various customer networks 130, which may be coupled to web server 102 and database servers 104 and 106, respectively, via the public internet 132, a hyperstream frame relay network 134, and/or other dial up facilities 136.

Accordingly, customer personnel accessing a network connection via a customer network such as one included within customer networks 130 may access internal intranet 128 via a dial-up facility through a firewall to gain access to customer and/or project information stored within database servers 104 and 106 via a conventional web browser facility. Because such information is centrally stored within a repository including data stored within database servers 104 and 106 which may be accessible via web server 102, a customer has ready access to current and up-to-date information related to a particular project or service offered and provided by an organization such as an organization that provides telecommunication services and the like. In particular, in the case that a network outage occurs, a customer may obtain ready access to information stored within data base servers 104 and 106 related to that particular customer via a web browser, for example, and immediately obtain information to contact appropriate personnel for correction and mitigation of network outage problems (e.g., such as via paging facilities 105).

Having such information available to all personnel associated with a particular project or service for a particular customer, for example, minimizes the amount of time need to contact someone. Additionally, system 100 may be outfitted with paging capability such that a script provided through web server 102 may allow automatic paging via paging facilities 105 to particular personnel about which data is stored in database servers 104 and 106 to allow a customer to automatically page a particular person at an active and current paging number in the event that problems and network difficulties are experienced. Such paging systems will be readily understood by those skilled in the art and may include text paging and the like. Accordingly, the present invention provides a singular and central store for customer and project information.

In addition, the present invention provides a reporting aspect that will allow various network management centers to report statistics such as mean time to repair, network availability, total number of tickets (e.g., trouble tickets) open, chronic issues and resolution scenarios etc. back to an account team and the customers associated therewith. By maintaining all of the reporting of such information on-line and in a current up-to-date central facility, the possibility that incorrect information is passed from one particular group to another is eliminated. The speed at which the reports are published may be measured in milliseconds unlike typical or traditional solutions where hard copy reports are printed and shipped overnight, etc. Customers and vendors can now download large files and print reports in a matter of seconds. Such a procedure eliminates the endless number of copies that are made for presentations and results are more user friendly. Less reproduction of unnecessary and unwanted copies will decrease reporting costs and increase information dissemination efficiency.

Furthermore, because the present invention utilizes HTML and other web based solutions to provide information, the present invention gives all parties involved with a particular service and/or project an interface to reports, data, and miscellaneous tools that are accessible through any standard web browser. The present invention provides servers which are accessible via various routes to account teams, engineers, and customer personnel. Moreover, the present invention will be available over connections such as dial-up facilities 136, dedicated circuits, shared local ETHERNET or even via the Internet (such as via the world wide web). Web server 102 will provide each appropriate group limited access to relevant information as defined through appropriate scripts, etc., which will be readily understood by those skilled in the art of information delivery and database storage after reviewing the present invention.

With specific regard to the access paths by which customer personnel may access web server 102 and data base servers 104 and 106, respectively, customers have the option of accessing the same via the public Internet 132, via hyperstream frame relay network 134, dial-up facilities, etc. Dial-up facilities are generally inexpensive and the simplest to establish. However, such facilities are limited by current analog modem speeds ranging from 28.8K bits per second up to almost 56K bits per second. In addition to the latency from such a slow connection, dial-up implementations provided by the present invention require that the customer set-up each of their computers with a dial-up facility. Accordingly, although dial-up facilities 136 are permitted in accordance with the present invention, customers and other personnel may choose not to use the same as dial-up facilities often are slower then desired.

Alternatively, customers and other personnel have the option of connecting to database servers 104 and 106 via web servers 102 via Internet connections. This option is simple to implement and can be done securely. Unfortunately, some customers and other personnel may be hesitant to rely on the public Internet due to security issues and the like. Although safe with encryption (e.g., SSL) on the browser side via a browser and a server system, a customer may be allowed to access a firewall available from an Internet service provider to the Internet.

Alternatively, a hyperstream frame relay (HSFR) connection may be used to establish a communications link between customer facilities and servers 102, 104 and 106 respectively. There are several key benefits that make this type of connection preferable over dial-up and Internet connections as discussed above. For example, a frame relay connection is a dedicated connection with guaranteed bandwidth. This insures that customers may access the information faster and allow developers of web sites, for example, to build content with graphics-intensive tools/pages. The circuit speeds can range from 56 kilobits (DS0) to 1.54 megabits (T1) based upon customer needs. A customer would have to add a single route to a service facility to their existing network routers to support hyperstream frame relay facilities. With such high-speed frame relay connections, a customer's data is only transmitted back to them and not via any other network connection which may be accessed by third parties such as those engaged in fraudulent review of network traffic. This version of connectivity can add value to a service by providing dedicated access. The customer, however, would purchase an additional permanent virtual circuit from a service provider for dedicated bandwidth or BOD (bandwidth on demand) requirements.

To facilitate secure data communications in the context of the present invention and, in particular, within the exemplary network arrangement illustrated in system 100, multiple security checkpoints are in place guaranteeing compliance with particular safety standards. If a customer is using dial-up communications, their communications will be restricted to the specific IP addresses of servers 102, 104, and 106. This type of restriction may be enforced via a firewall connection such as one handled by firewall 126. In the context of Internet and hyperstream frame relay, a first security checkpoint for Internet or HSFR connections is a CISCO router that is connected to the Internet and HSFR. This router would have access lists placed in it that limit each customer to their virtual IP address on the web server as well as restricting traffic to the HTTP protocol. In the event that a customer is using a private network address, an entry router will be configured with CISCO's national address translation software, eliminating the aforementioned problems.

Additionally, all connections through dial-up, Internet and hyperstream frame relay will go through a firewall 122. This firewall will be configured to restrict the customer, for example, to specific IP addresses of servers 102, 104, and 106. This firewall can be configured to grant everyone on the customers' own Intranet access to the web server or only the IP address that the customer provides.

Once the customer attempts to access web server 102, they will have to authenticate themselves via a secure, encrypted login sequence. Such login sequence will validate the users security privileges, for example, via the WINDOWS NT system level in the event that WINDOWS NT Version 4.0 (manufactured and marketed by MICROSOFT CORPORATION) is used. Each customer will belong to a specific NT system group which will allow them access to their particular homepage (as specified via a specific port and virtual server connection) while restricting them from other areas on the same server.

Each active server page will check in an encrypted database that will verify regions (home IP addresses) of the web server to which the particular user or customer has attempted to gain access.

Accordingly, the structure and arrangements depicted in FIG. 1, link personnel from various user populations (engineers, support personnel, customers, etc.) to customer systems allowing data to be shared that is otherwise stored in a single, central location. The dissemination of information in this manner is unique in the telecommunications service industry. Additionally, the present invention allows reports to be prepared via on-line sessions and to be made available directly to customers and corresponding account teams. The customer can page, send e-mail, and even videoconference with engineers from a web site initiated location.

By sharing a single source of data with customers and other personnel, a network service provider can react to problems in a more timely fashion to network outages, etc. The present invention prevents double keying of information and thus prevents entry errors. Additional benefits of the present invention include shared reports, commonality among all network management centers, data dissemination and tracking, and procedure availability. Streamlining and consistency are key parts to the novel approaches provided by the present invention. Any telecommunications company that utilizes the present invention may be able to manage more data networks and service additional customers. The present invention facilitates the dissemination of information from a central storage facility to those customers and other personnel who have appropriate access to the same. The operations that may be carried out to realize such functionality are illustrated in FIG. 2, to which reference is now made.

Figure 2:
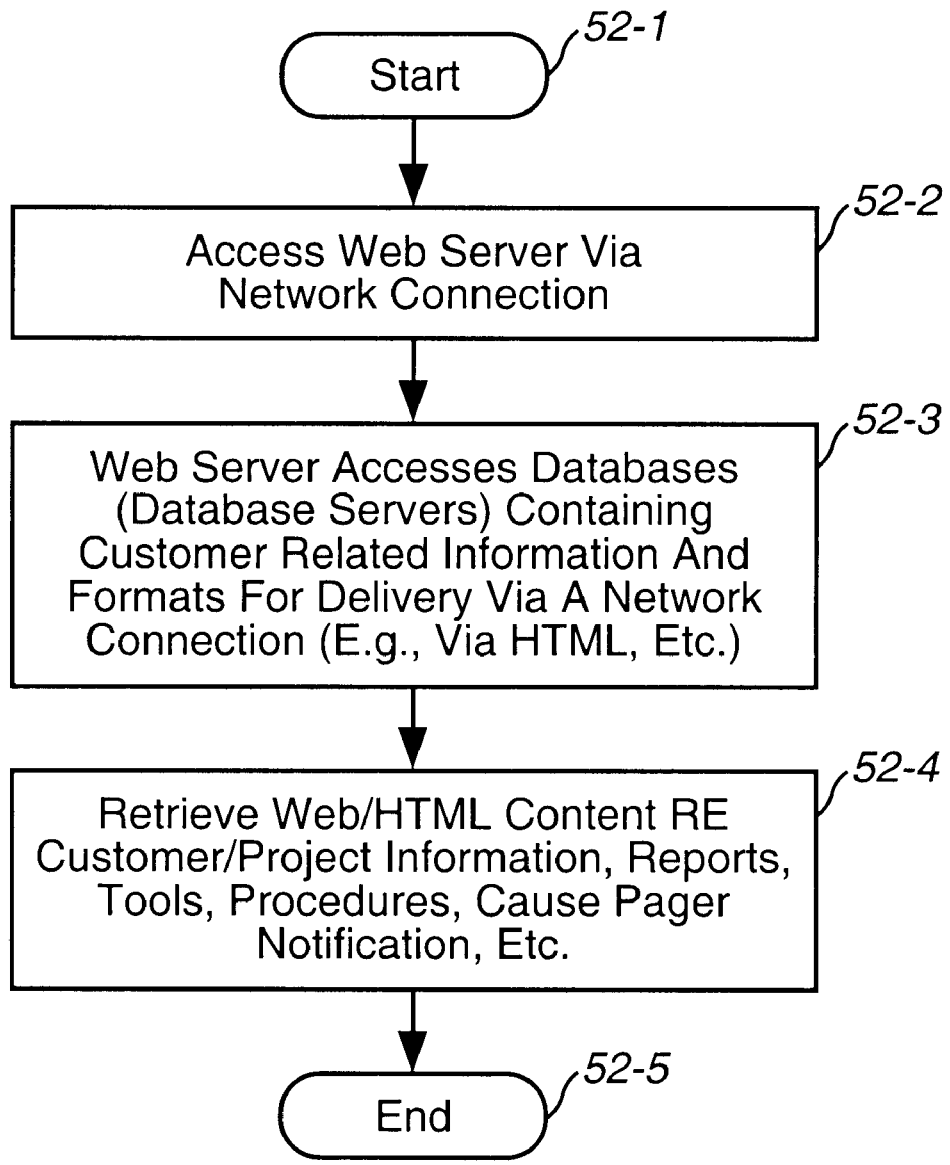
FIG. 2 is a flowchart that illustrates steps that may be carried out within the system depicted in FIG. 1 to store and retrieve customer and project related information.

In particular, FIG. 2 illustrates the operations that may be carried out to obtain centrally stored information related to customers and/or projects. More particularly, FIG. 2 illustrates a flow chart that depicts the operations that may be carried out to obtain such information. In particular, process operations start at step S2-1 and immediately proceeds to step S2-2. At step S2-2, a customer and/or other personnel may access web server 102 via a network connection as described above with regard to system 100 shown in FIG. 1.

Next, at step S2-3, web server 102 will access databases containing customer-related information and format the same for delivery via a hypertext interface according to the present invention.

Next, at step S24, a user's end terminal (such as a customer's end user terminal or personnel data processing system such as a personnel computer, etc.) may receive web content and/or HTML content regarding customer related information, reports, tools, etc. from web server 102 via a network connection as described above.

Processing ends at step S2-5.

Thus, having fully described the present invention by way of example with reference to the attached drawings figures, it will be readily appreciated that many changes and modifications may be made to the invention and to any of the exemplary embodiments shown and/or described herein without departing from the spirit or scope of the invention, which is defined in the appended claims.

What is claimed is:

1. A system for storing and delivering customer information, said system comprising:
   a data storage system storing a shared database containing both customer service information and network information related to at least one network service customer to whom network services are provided by a network service provider, said network information specifying a network address, a network protocol, and a service procedure to be performed by said network service provider in provision of said network services;
   a network access system coupled to said data storage system via at least one data communications link and configured to permit at least one user associated with said network service customer to access and retrieve said customer service information from said shared database via an external public network and to permit at least one user associated with said network service provider to access and retrieve said network information from said shared database via an intranet; and
   communication means for automatically initiating communication with one or more network service provider personnel in response to said at least one user accessing said customer service information to report service trouble;
   wherein said data storage system and said network access system belong to an addressable data network, said data storage system has at least one associated network address, and said at least one user accesses customer-specific customer service information related to said at least one network service customer by specifying a customer-specific network address.

2. The system according to claim 1, wherein said data storage system includes at least one server system configured to serve a corresponding portion of said customer service information to said at least one user via said network access system.

3. The system according to claim 1, wherein said data storage system includes a web server configured to serve hypertext documents related to at least a portion of said customer service information.

4. The system according to claim 3, wherein said hypertext documents are HTML documents.

5. The system according to claim 1, wherein said data storage system includes a database server configured to store and serve said customer service information.

6. The system according to claim 1, wherein said network access system includes a plurality of network access facilities permitting said at least one user to access said customer service information stored by said data storage system.

7. The system according to claim 1, further comprising a security system coupled to said network access system and configured to provide secure data communications between said network access system and said data storage system.

8. The system according to claim 1, further comprising a data redundancy facility to provide data redundancy to said data storage system.

9. The system of claim 1, wherein the shared database further stores service usage information for said at least one network service customer with said customer service information.

10. The system of claim 1, wherein the communication means comprises paging facilities.

11. A method for storing and delivering customer information, said method comprising:
   in a shared database of an electronic data storage system, storing customer service information and network information related to at least one network service customer to whom network services are provided by a network service provider, said network information specifying a network address, a network protocol, and a service procedure to be performed by said network service provider in provision of said network services, wherein said storing step is performed by a data storage system including at least one server system configured to serve a corresponding portion of said customer service information to said at least one user;
   utilizing a network access system, providing access by at least one user associated with said network service customer to said customer service information in said shared database via an external public network and providing access by at least one user associated with said network service provider to said network information via an intranet, wherein said data storage system and said network access system belong to an addressable data network, and wherein providing access includes providing access to customer-specific customer service information pertaining to said at least one network service customer that is stored within said data storage system by referencing a customer-specific network address; and in response to said at least one user accessing said customer service information to report service trouble, automatically initiating communication with one or more network service provider personnel.

12. The method according to claim 11, wherein providing access comprises providing access to said customer service information by a web server configured to serve hyper-text documents including at least a portion of said customer service information.

13. The method according to claim 12, wherein said hyper-text documents are HTML documents.

14. The method according to claim 11, wherein providing access comprises providing access to said customer service information with a database sewer configured to store and serve said customer service information.

15. The method according to claim 11, wherein providing access comprises providing access via any one of a plurality of network access facilities.

16. The method according to claim 11, further comprising the step of securely communicating data between said network access system and said data storage systems.

17. The method according to claim 11, further comprising storing a redundant copy of said customer service information in a data redundancy facility.

18. The method of claim 11, wherein access by at least one user associated with said network service customer to said customer service information in said shared database is provided in response to validation of a login sequence entered at a remote data processing system.

19. The method according to claim 18, wherein receiving customer service information includes receiving customer-specific reports related to service usage by said network service customer.

20. The method of claim 11, and further comprising storing service usage information for said at least one network service customer in the shared database with said customer service information.

21. The method of claim 11, wherein automatically initiating communication comprises automatically paging one or more network service provider personnel.

* * * * *